United States Patent [19]
McCoy

[11] Patent Number: 5,694,431
[45] Date of Patent: Dec. 2, 1997

[54] METHOD AND APPARATUS FOR AVERAGE POWER CONTROL

[75] Inventor: James Wesley McCoy, Richland Hills, Tex.

[73] Assignee: Motorola, Inc., Schaumburg, Ill.

[21] Appl. No.: 587,621

[22] Filed: Jan. 17, 1996

[51] Int. Cl.$^6$ .................................................. H04L 27/04
[52] U.S. Cl. .................................... 375/295; 375/297
[58] Field of Search ................................ 375/260, 295, 375/297; 455/91, 127; 330/127

[56] References Cited

U.S. PATENT DOCUMENTS

| | | | |
|---|---|---|---|
| 3,900,823 | 8/1975 | Sakai et al. ...................... | 375/295 |
| 5,222,104 | 6/1993 | Mendendorp . | |
| 5,249,201 | 9/1993 | Posner et al. ...................... | 375/295 |
| 5,302,914 | 4/1994 | Arntz et al. . | |
| 5,420,536 | 5/1995 | Faulkner et al. .................. | 330/149 |
| 5,423,082 | 6/1995 | Cygan et al. ...................... | 455/126 |
| 5,524,275 | 6/1996 | Lindell ............................... | 455/127 |
| 5,548,616 | 8/1996 | Mucke et al. ..................... | 375/297 |

Primary Examiner—Tesfaldet Bocure
Attorney, Agent, or Firm—Pablo Meles

[57] ABSTRACT

A transmitter (1) with improved average power comprises a mixer (34) for receiving an input signal (21) and providing a mixed signal (23) to an average power controller (14) comprising a fast automatic gain controller (26) for receiving the mixed signal and providing a conditioned signal to a hard limiter (28) for foldback clipping the conditioned signal to provide an output signal (15). The average power controller further comprises an error control signal generator (24, 30, 36) for generating an error control signal (27) calculated by subtracting (36) an average power estimation (30) of the output signal from a given nominal average power value (24). Finally, the average power controller also comprises a feedback loop (29) for feeding back the error control signal to the mixer for controlling the gain of the input signal.

20 Claims, 2 Drawing Sheets 5,694,431

METHOD AND APPARATUS FOR AVERAGE POWER CONTROL

FIELD OF THE INVENTION

This invention relates in general to radio communication transmitters and more specifically to a method and apparatus for controlling average power in radio communication transmitters.

BACKGROUND OF THE INVENTION

Wireless telecommunications systems are divided into a series of cell areas covering a service area. Each cell area has a transmitting base station using an operating frequency set comprising a plurality of radio channels to communicate with mobile subscribers. Each channel represents an information signal at a particular frequency carrier or band.

In many instances it is advantageous to combine these channels for transmission purposes. The channels can all be combined by a broadband signal combiner into a multichannel signal at low power levels and then amplified by a single linear amplifier (or its equivalent, a plurality of linear amplifiers in parallel, each amplifying a reduced power version of the same multi-channel signal) to raise the multi-channel signal to an appropriate transmit power level.

Peak to average ratio compression is a technique of improving average power levels from a transmitter with low peak power capability. Traditionally, this is accomplished with adaptive gain control and clipping. These techniques create frequency domain splatter and increase the noise floor of the transmitted signal. Thus, a need exists for a low splatter technique and apparatus that maintains an appropriate noise floor threshold and high recovered signal fidelity while increasing the average power transmitter out of a transmitter.

SUMMARY OF THE INVENTION

In a first aspect of the present invention, a method for power control in a transmitter comprises the steps of receiving an input signal for transmission, conditioning the input signal using a conditioner to provide a conditioned signal, hard limiting the conditioned signal to provide an output signal, obtaining an error control signal by estimating an average power from the output signal and subtracting the estimated average power from a nominal average power, and feeding back and mixing the error control signal with the input signal.

In a second aspect of the present invention, a power limiter for use in radio frequency transmissions comprises a mixer for receiving an input signal and providing a mixed signal, a conditioner for receiving the mixed signal and providing a conditioned signal within a given window. The power limiter further comprises a hard limiter for limiting the conditioned signal to provide an output signal having an upper threshold, an error control signal generator for generating an error control signal calculated by subtracting an average power estimate from the output signal from a nominal power input to provide the error control signal, and a feedback loop for feeding back the error control signal to the mixer for mixing with and controlling the gain of the input signal.

DESCRIPTION OF THE PREFERRED EMBODIMENT

Figure 1:
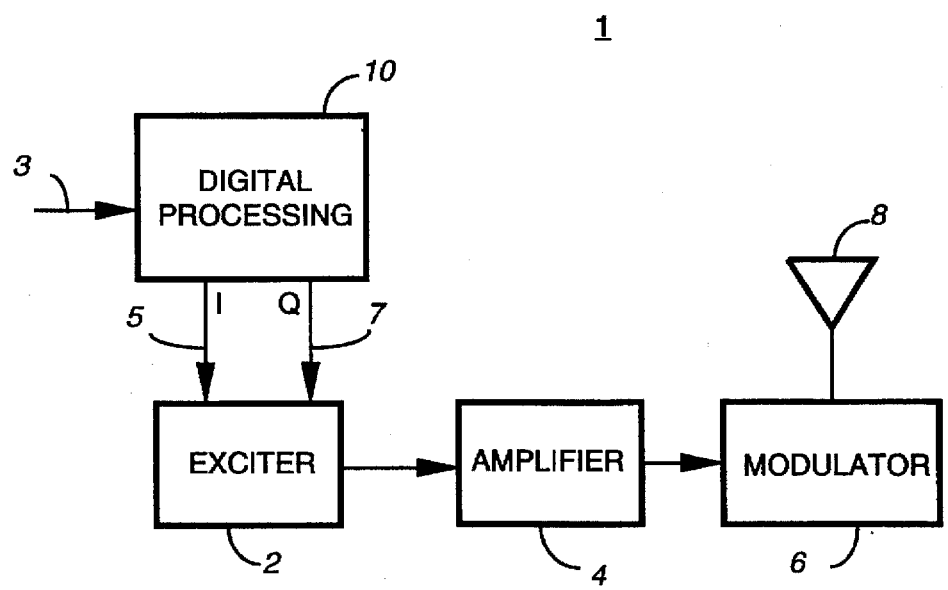
FIG. 1 is an electrical block diagram of a transmitter in accordance with the preferred embodiment of the present invention.

Referring to FIG. 1, a method and apparatus for average power control in a transmitter 1 generally comprises an input signal 3 that is digitally processed preferably using a digital processor 10 wherein two independent signals are provided directly via I (5) and Q (7) components to an exciter 2. The exciter output is then amplified by an amplifier 4 and modulated (preferably using quadrature amplitude modulation) using modulator 6 providing a modulated signal. The modulated signal is then transmitted over the air via an antenna 8.

Figure 2:
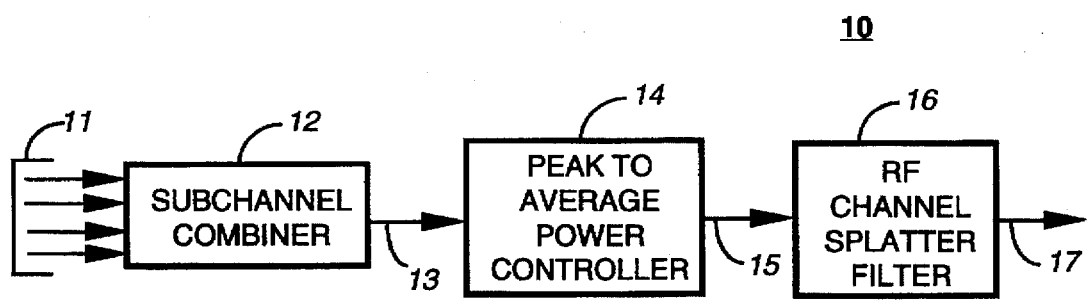
FIG. 2 is an electrical block diagram of a digital processing block of the transmitter in accordance with the present invention.

Referring to FIG. 2, an electrical block diagram of the digital processor 10 of the transmitter 1 is shown in accordance with the present invention. Preferably, the digital processor 10 comprises a multiple subchannel combiner 12 that combines multiple subchannel signals 11 provided to the combiner 12 and provides an input signal 13 to the average power controller 14. Preferably, the average power controller 14 is a Peak to Average Power controller that provides an output signal 17 via an radio frequency (RF) channel splatter filter 16. The RF channel splatter filter is designed to prevent spectral leakage of the output signal 15 into adjacent RF channels.

Figure 3:
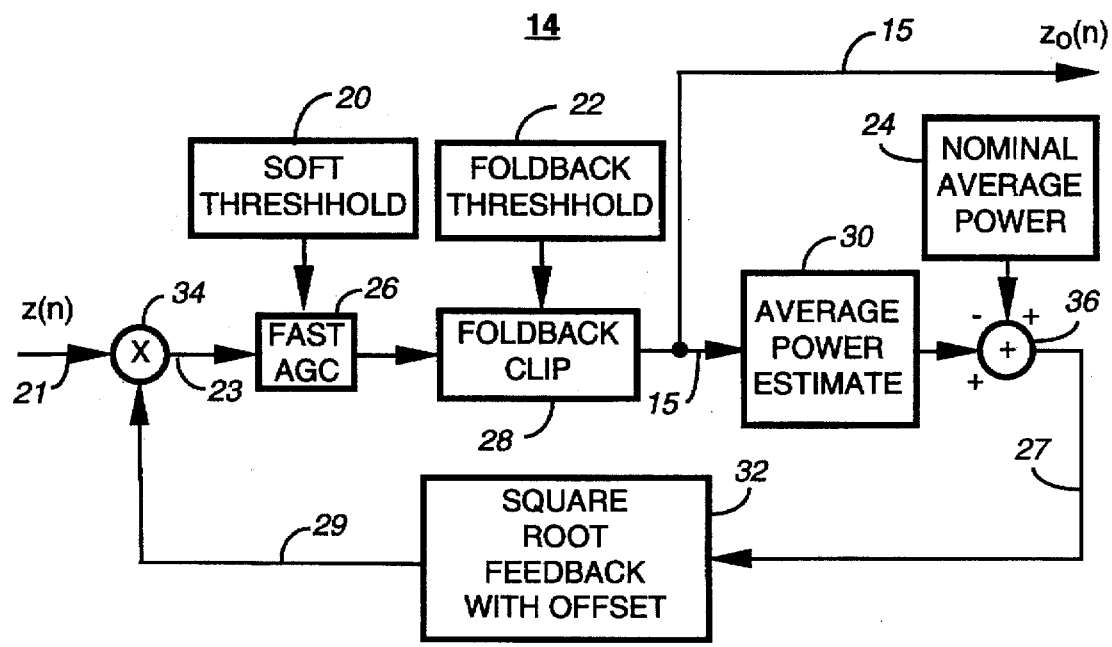
FIG. 3 is an electrical block diagram of an average peak to power limiter in accordance with the present invention.

Referring to FIG. 3, an electrical block diagram of an average power controller 14 in accordance with the present invention is shown. The average power controller is preferably a peak to average power controller comprising a mixer 34 for receiving an input signal 21 and providing a mixed input signal 23 for subsequent transmission. The input signal is preferably conditioned using a conditioner such as a fast adaptive gain controller (AGC) 26 to provide a conditioned signal. The fast AGC 26 can optionally use a soft threshold input 20 to define a threshold amplitude for the conditioned signal. The conditioned signal provided by the fast AGC 26 is then hard limited using a hard limiter such as a foldback clipper 28. The foldback clipper can optionally use a foldback threshold input 22 to provide an upper threshold limit for the power. The foldback clipper provides an output signal 15. An average power estimation value 30 is computed from the output signal 15 and subtracted (36) from a given nominal average power value 24 to determine an error control signal 27. Alternatively, an peak to average power estimation value can be subtracted from a nominal average to peak power value or an RMS Average Power estimation value can be subtracted from an Nominal RMS Average Power value respectively to likewise provide a similar error control signal 27. The error control signal 27 is fed back and mixed with the input signal 21 at the mixer 34 to adjust the gain of the mixed input signal 23. Optionally, the error control signal 27 can be fed back to the mixer 34 via a square root feedback with an offset function 32. In any event, the subtraction (36) of the average power estimate 30 from the nominal average power 24 forms an error control signal generator for generating the error control signal that is fed back to the mixer 34 for controlling the gain of the mixed input signal 23.

Figure 4:
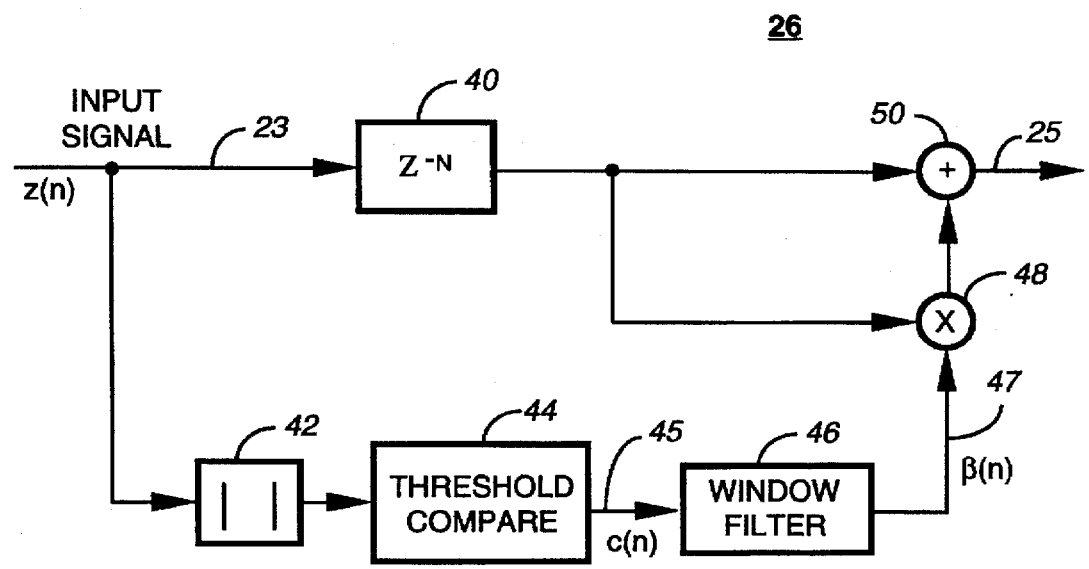
FIG. 4 is an electrical block diagram of a fast adaptive gain controller in accordance with the present invention.

Referring to FIG. 4, a fast AGC 26 preferably provides for a smooth way of reducing the peak to average ratio of an input signal 23. The design is noncausal, as can be seen by the delay 42 in the path of the input signal. The complex envelope of the input signal is compared to a threshold within a threshold compare block 44. The output signal 45 (c(n)) from the threshold compare block 44 is zero if the envelope of the signal is within a windowed threshold. If the envelope of the signal exceeds the threshold, the second order IIR filter receives a nonzero input from the threshold compare block 44 as represented below:

$$\beta_0(n) = \beta(n) p_1^N$$
$$c(n) = 1, \quad (1 - \beta_0(n))|z(n+N)| > T_H$$
$$c(n) = -1, \quad (1 - \beta_0(n))|z(n+N)| < T_L$$
$$c(n) = 0, \quad T_L > (1 - \beta_0(n))|z(n+N)| > T_H$$

where $p_1$ is pole of a window filter 46 which is preferably a second order IIR filter closest to the unit circle. Subsequent paragraphs discuss pole locations in depth. The fast AGC 26 creates a window function through the feedforward path (47), scaling down the input signal.

$$\beta(n) = k(p_1 - p_2)c(n) + (p_1 + p_2)\beta(n-1) + p_1 p_2 \beta(n-2)$$
$$z_0(n) = (1 - \beta(n))z(n)$$

where $p_1$ and $P_2$ are the pole locations. The windowing function, $\beta$, is the output signal 47 coming out of the window filter 46 (or second order IIR filter). Three design parameters determine the filter coefficients. The filter is designed such that the maximum value of the step response, $\delta_{max}$, is less than or equal to one. This prevents the scaling factor from going negative. In simulations, $\delta_{max}=1$ works well. This parameter determines the harshness of the windowing. Decreasing $\delta_{max}$ softens the clipping. Along with the attack time and decay time, this completely determines the filter coefficients as follows.

$$k = \frac{\delta_{max}(1 - p_1)(1 - p_2)}{p_1 - p_2}$$
$$p_1 = e^{-Ts/Td}$$
$$p_2 = e^{-Ts/Td}$$
$$0 < p_2 < p_1 < 1$$

where Ts is the sampling period, Td is the decay time, and Ta is the attack time. Because the AGC is noncausal, the window function scaling is maximum at the same instant that the input signal exceeds the threshold. The delay required to implement the noncausality is related to the filter pole locations as follows.

$$N = \frac{\ln(\ln(p_2)) - \ln(\ln(p_1))}{\ln(p_1) - \ln(p_2)}$$

Unlike an AGC used for stabilizing the rms value of a signal, the AGC in this application should have very fast attack and decay times. Attack times of around 200 μsec and decay times of around 400 μsec have worked well in simulations. The decay time should always be greater than the attack time.

What is claimed is:

1. A method for power control in a transmitter, comprising the steps of:

receiving an input signal for transmission;

conditioning the input signal using a conditioner to provide a conditioned signal;

hard limiting the conditioned signal to provide an output signal;

obtaining an error control signal by estimating an average power from the output signal and subtracting the average power from a nominal average power; and feeding back and mixing the error control signal with the input signal.

2. The method of claim 1, wherein step of conditioning the input signal uses a fast adaptive gain controller as a conditioner.

3. The method of claim 1, wherein the step of hard limiting uses a foldback clipper.

4. The method of claim 1, wherein the step of obtaining an error control signal is done by estimating an average to peak power from the output signal and subtracting the average to peak power from a nominal average to peak power.

5. The method of claim 1, wherein the step of obtaining an error control signal is done by estimating an root-mean-square power from the output signal and subtracting the root-mean-square power from a nominal root-mean-square power.

6. A method for peak to average power control in a transmitter, comprising the steps of:

receiving at a mixer an input signal for transmission;

conditioning the input signal using a fast adaptive gain controller to provide a conditioned signal;

hard limiting the conditioned signal using a foldback clipper to provide an output signal;

estimating an average to peak power from the output signal and subtracting the average to peak power from a nominal average to peak power to obtain an average to peak power error control signal; and feeding back the average to peak power error control signal to the mixer for mixing with the input signal.

7. The method of claim 6, wherein the step of conditioning the input signal using a fast adaptive gain controller uses a soft threshold to define a threshold window.

8. The method of claim 6, wherein the step of hard limiting using a foldback clipper uses a foldback threshold to define an upper threshold limit.

9. The method of claim 6, wherein the step of estimating an average to peak power uses a recursive equation to estimate an average power out of the transmitter and subsequently computes the average to peak power.

10. The method of claim 6, wherein the step of feeding back the average to peak power error control signal comprises a square root feedback with an offset.

11. A method for peak to average power control in a transmitter, comprising the steps of:

receiving from a subchannel combiner an input signal at a mixer having an input signal gain;

conditioning the input signal using a fast adaptive gain controller to provide a conditioned signal;

hard limiting the conditioned signal using a foldback clipper to provide an output signal;

estimating an average to peak power from the output signal and subtracting the average to peak power from a nominal average to peak power to obtain an average to peak power error control signal; and feeding back the average to peak power error control signal to the mixer to control the input signal gain.

12. A power limiter for use in radio frequency transmissions, comprising:

a mixer for receiving an input signal and providing a mixed signal;

a conditioner for receiving the mixed signal and providing a conditioned signal within a given window;

a hard limiter for limiting the conditioned signal to provide an output signal having an upper threshold;

an error control signal generator for generating an error control signal calculated by subtracting an average power estimate from the output signal from a nominal power input to provide the error control signal; and a feedback loop for feeding back the error control signal to the mixer for mixing with and controlling the gain of the input signal.

13. The power limiter of claim 12, wherein the error control signal is partially formed by subtracting an estimated average to peak power from a predetermined nominal average to peak power to provide an average to peak power error signal.

14. The power limiter of claim 12, wherein the conditioner comprises a fast adaptive gain controller using a soft threshold to define a threshold window.

15. The power limiter of claim 12, wherein the hard limiter comprises a foldback clipper using a foldback threshold to define an upper threshold limit.

16. The power limiter of claim 14, wherein a square root with offset function is applied to the error control signal to provide a feedback signal which is mixed with the input signal and supplied to the fast automatic gain controller.

17. A transmitter with improved average power, comprising:

a mixer for receiving an input signal and providing a mixed signal for subsequent radio frequency transmission;

an average power controller, comprising:

a fast automatic gain controller for receiving the mixed signal and providing a conditioned signal;

a hard limiter for foldback clipping the conditioned signal to provide an output signal;

an error control signal generator for generating an error control signal calculated by subtracting an average power estimation of the output signal from a given nominal average power value;

a feedback loop for feeding back the error control signal to the mixer for controlling the gain of the input signal.

18. The transmitter of claim 17, wherein the error control signal is partially formed by subtracting an estimated average to peak power of the output signal from a predetermined nominal average to peak power value.

19. The transmitter of claim 17, wherein a square root with offset function is applied to the error control signal to provide a feedback signal which is mixed with the input signal and supplied to the fast automatic gain controller.

20. The transmitter of claim 17, wherein the input signal is formed from multiple subchannel signals and the transmitter further comprises a subchannel combiner coupled to the average power controller.

\* \* \* \* \*